United States Patent [19]
Ito et al.

[11] Patent Number: 6,104,411
[45] Date of Patent: Aug. 15, 2000

[54] ELECTRONIC COMPUTING APPARATUS HAVING GRAPH DISPLAYING FUNCTION AND METHOD FOR DISPLAYING GRAPH

[75] Inventors: Matsutaka Ito; Miho Ohba, both of Yamatokoriyama, Japan

[73] Assignee: Sharp Kabushiki Kaisha, Osaka, Japan

[21] Appl. No.: 09/058,286

[22] Filed: Apr. 10, 1998

[30] Foreign Application Priority Data

Apr. 16, 1997 [JP] Japan ................................ 9-099331

[51] Int. Cl.⁷ ............................ G06T 11/20; G06F 1/02
[52] U.S. Cl. .................... 345/440; 708/272; 708/276; 345/352
[58] Field of Search ..................... 345/134, 140, 345/439, 440; 702/64–68, 70–73, 78; 708/4, 137, 138–140, 144–145, 160, 235, 272, 276, 308, 802, 811

[56] References Cited

U.S. PATENT DOCUMENTS 4,794,553  12/1988  Watanabe et al. .................. 345/439
4,794,554  12/1988  Tamiya ................................ 345/439
5,535,317  7/1996  Tanaka et al. ..................... 345/440
5,539,867  7/1996  Handa et al. ...................... 345/440

FOREIGN PATENT DOCUMENTS 61-261780  11/1986  Japan .

Primary Examiner—Ba Huynh
Attorney, Agent, or Firm—Nixon & Vanderhye, P.C.

[57] ABSTRACT

There are provided an electronic computing apparatus having a graph displaying function and a graph displaying method which allow an optimum graph to be quickly displayed. A graph is displayed on a display based on data for displaying the graph inputted from a key input section or the like. When one numeric key selected from among a plurality of numeric keys is specified by a predetermined number of times, a quadrant corresponding to the numeric key is selected from a quadrant selection table and a scale corresponding to the specified number of times is selected from a quadrant scale selection table, redisplaying a part of the graph existing in the selected quadrant on the selected scale. Thus, a desired graph may be quickly displayed by selecting the quadrant and scale of the displayed graph.

8 Claims, 10 Drawing Sheets

| NUMERIC KEY | QUADRANT |
|---|---|
| 1 | FIRST |
| 2 | SECOND |
| 3 | THIRD |
| 4 | FOURTH |

FIG. 3

| SPECIFIED NUMBER OF TIMES | QUADRANT SCALE |
|---|---|
| 0 | INITIAL SET VALUES |
| 1 | FIRST SET VALUES |
| 2 | SECOND SET VALUES |
| 3 | THIRD SET VALUES |

| No. | QUADRANT |
|---|---|
| 1 | SECOND |
| 2 | FIRST, SECOND |
| 3 | FIRST |
| 4 | SECOND, THIRD |
| 5 | FIRST THROUGH FOURTH |
| 6 | FIRST, FOURTH |
| 7 | THIRD |
| 8 | THIRD, FOURTH |
| 9 | FOURTH |

FIG. 9A

| No. | X-AXIS SCALE |
|---|---|
| 0 | FIRST SET VALUES |
| 1 | SECOND SET VALUES |
| 2 | THIRD SET VALUES |
| 3 | FOURTH SET VALUES |
| 4 | FIFTH SET VALUES |
| 5 | SIXTH SET VALUES |
| 6 | SEVENTH SET VALUES |

FIG. 9B

| No. | Y-AXIS SCALE |
|---|---|
| 0 | FIRST SET VALUES |
| 1 | SECOND SET VALUES |
| 2 | THIRD SET VALUES |
| 3 | FOURTH SET VALUES |
| 4 | FIFTH SET VALUES |
| 5 | SIXTH SET VALUES |
| 6 | SEVENTH SET VALUES |

ELECTRONIC COMPUTING APPARATUS HAVING GRAPH DISPLAYING FUNCTION AND METHOD FOR DISPLAYING GRAPH

BACKGROUND OF THE INVENTION

1. Field of the Invention

The present invention relates to an electronic computing apparatus such as an electronic calculator and an electronic pocketbook, capable of displaying a graph such as a functional graph and a statistical graph, and to a method for displaying such a graph.

2. Description of Related Art

Hitherto, there have been known electronic computing apparatuses capable of displaying a graph such as a functional graph and a statistical graph. Such computing apparatus comprises an input section and a display and displays a graph of functional data or statistical data when the functional data or statistical data to be displayed is input and it is specified to display the graph. At this time, the graph is displayed under the condition initially set in advance. In case of the functional data for example, the condition having a predetermined scale for equally displaying the first quadrant, second quadrant, third quadrant and fourth quadrant on an X-Y coordinate system which is an orthogonal coordinate system, is initially set.

When the scale initially set is not appropriate, the graph might be too small or too large. When the quadrant to be displayed is not appropriate, the graph might not be displayed. Because it is difficult to decide the optimum display condition before displaying the graph, the optimum display condition is decided by repeatedly displaying the graph and changing the display condition, i.e. by displaying the graph once under the display condition initially set and by changing the display condition by inputting it from the input section while watching the graph. Thus, the optimum display condition has been decided on the trial-and-error base and accordingly, it has been difficult to quickly display the most appropriate graph.

For example, although the prior art electronic computing apparatus disclosed in Japanese Unexamined Patent Publication JP-A 61-261780 (1986) has been arranged so as to set a display range of a graph to be displayed and not to display a graph outside of that set range, it has been difficult to quickly display the most appropriate graph because the range had to be changed when the set display range is not appropriate.

SUMMARY OF THE INVENTION

Hence, it is an object of the present invention to provide an electronic computing apparatus having a graph displaying function and provide a graph displaying method which allows a most appropriate graph to be quickly displayed.

The present invention provides an electronic computing apparatus having a graph displaying function for displaying a graph on graph displaying means on the basis of data for displaying the graph, the electronic computing apparatus comprising:

quadrant selecting means for selecting a quadrant of the graph displayed on the graph displaying means;

scale selecting means for selecting a scale of the graph displayed on the graph displaying means; and display control means for displaying again the graph in the quadrant selected by the quadrant selecting means with the scale selected by the scale selecting means on the graph displaying means.

According to the invention, when data for displaying a graph, i.e. data representing a functional expression for displaying a functional graph and data representing variables of the functional expression for example, is input, the graph is displayed on the graph displaying means based on such data. Because the graph in the quadrant selected by the quadrant selecting means among the quadrants of the displayed graph is displayed again on the graph displaying means with the scale selected by the scale selecting means, the most appropriate graph may be displayed quickly.

The electronic computing apparatus of the invention is characterized in that, the quadrant selecting means includes:

a plurality of quadrant specifying means; and a quadrant selection table for storing each quadrant specifying means and each quadrant while correlating to each other, and selects a quadrant corresponding to the quadrant specifying means selected among the plurality of quadrant specifying means the quadrant selection table.

According to the invention, when desired quadrant specifying means is selected among the plurality of quadrant specifying means, a quadrant corresponding to the selected quadrant specifying means is selected from the quadrant selection table. Thus, the quadrant of the graph to be displayed may be selected.

The electronic computing apparatus of the invention is characterized in that, the scale selecting means includes:

single scale specifying means; and a scale selection table for storing a number of times specified by the scale specifying means and each scale while correlating to each other, and selects a scale corresponding to the number of times specified by the scale specifying means from the scale selection table.

According to the invention, specifying a predetermined number of times by the scale specifying means allows the scale corresponding to the specified number of times to be selected from the scale selection table. Thus, the scale of the graph to be displayed may be selected.

The electronic computing apparatus of the invention further comprises quadrant selection table displaying means for displaying the quadrant selection table.

According to the invention, it is possible to select the most appropriate quadrant while confirming all the quadrants because the quadrant selection table is displayed.

The electronic computing apparatus of the invention further comprises scale selection table displaying means for displaying the scale selection table.

According to the invention, it is possible to select the most appropriate scale while confirming all the scales because the scale selection table is displayed.

The invention provides a method for displaying a graph on an electronic computing apparatus, the method comprising the steps of:

displaying a graph on the basis of data for displaying the graph;

selecting a quadrant of redisplay;

selecting a scale of redisplay; and redisplaying a graph which is a part of the displayed graph existing in the selected quadrant, on the selected scale.

According to the invention, by selecting the quadrant of redisplay and by selecting the scale of redisplay when the graph is displayed on the basis of the data for displaying the graph, the part of the displayed graph existing in the selected quadrant may be appropriately and quickly redisplayed on the selected scale.

The method for displaying a graph on an electronic computing apparatus of the invention is characterized in that, the scale can be specified by a number of times of specifying the selected quadrant of the graph to be redisplayed.

According to the invention, since the scale can be specified by the number of times of inputting the quadrant, specifying the selected quadrant and scale can be readily carried out at the same time.

The method for displaying a graph on an electronic computing apparatus of the invention is characterized in that, all quadrants possible to selected are displayed in selecting a quadrant.

According to the invention, a desired quadrant can be selected while confirming all the quadrants.

The method for displaying a graph on an electronic computing apparatus of the invention is characterized in that, all scales possible to selected are displayed in selecting a scale.

According to the invention, a desired scale can be selected while confirming all the scales.

BRIEF DESCRIPTION OF THE DRAWINGS

Other and further objects, features, and advantages of the invention will be more explicit from the following detailed description taken with reference to the drawings wherein:

FIGS. 9A and 9B show quadrant scale selection tables 25, wherein FIG. 9A shows a scale selection table 25a and FIG. 9B shows another quadrant scale selection table 25b;

DETAILED DESCRIPTION OF THE PREFERRED EMBODIMENTS

Now referring to the drawings, preferred embodiments of the invention are described below.

Figure 1:
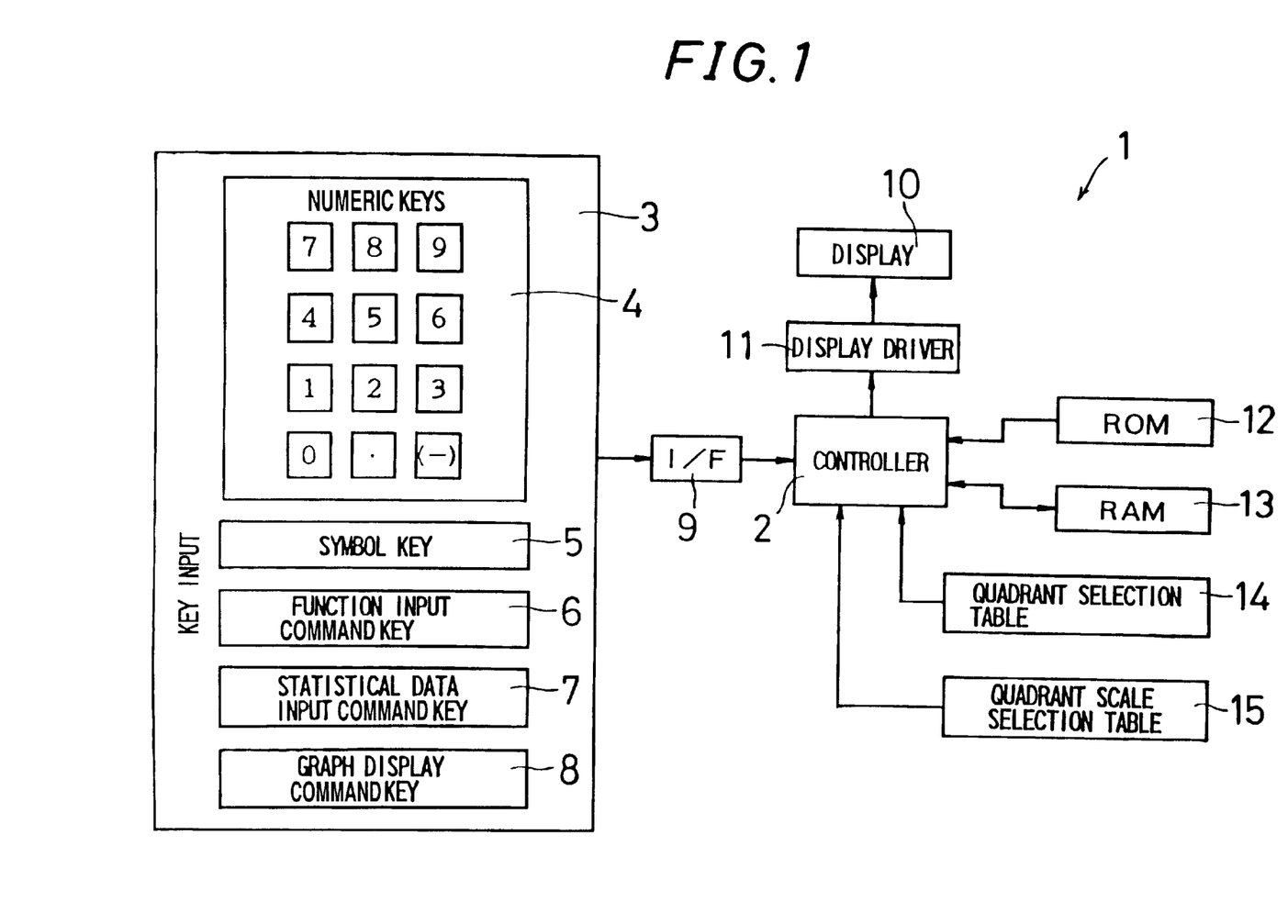
FIG. 1 is a block diagram showing an electrical structure of an electronic computing apparatus 1 according to a first embodiment of the present invention.

FIG. 1 is a block diagram showing an electrical structure of an electronic computing apparatus 1 according to a first embodiment of the present invention. The electronic computing apparatus 1 comprises a controller 2, a key input section 3, an I/F (interface) section 9, a display 10, a display driver 11, a ROM (Read Only Memory) 12, a RAM (Random Access Memory) 13, a quadrant selection table 14 and a quadrant scale selection table 15. The key input section 3 comprises a plurality of numeric keys 4 including those of 0 through 9, a decimal point (.), minus (−) and others, a symbol key 5, a function input command key 6, a statistical data input command key 7 and a graph display command key 8.

The controller 2 is electrically connected with the key input section 3 via the I/F section 9, with the display 10 via the display driver 11, with the ROM 12, the RAM 13, the quadrant selection table 14 and the quadrant scale selection table 15, respectively, and generally controls the operations of the whole electronic computing apparatus 1 in accordance with an operating program stored in the ROM 12. The controller 2 is realized by a microprocessor for example.

When the function input command key 6 of the key input section 3 is specified, a function input command signal is given to the controller 2 via the I/F section 9. In response to the function input command signal, the controller 2 becomes ready to receive inputs of functional data and then recognizes the data input from the numeric keys 4 and the symbol key 5 as data representing a functional expression for displaying a functional graph or data representing variables of the functional expression.

When the statistical data input command key 7 is specified, a statistical data input command signal is given to the controller 2 via the I/F section 9. In response to the statistical data input command signal, the controller 2 becomes ready to receive inputs of statistical data and then recognizes the data input from the numeric keys 4 and the symbol key 5 as data for displaying a statistical graph such as a histogram.

The data representing the functional expression for displaying the functional graph, the data representing the variables of the functional expression and the data for displaying the statistical graph thus input are stored in the RAM 13. The RAM 13 is used also for processing data in executing various operations.

When the graph display command key 8 is specified, a graph display command signal is given to the controller 2 via the I/F section 9. In response to the graph display command signal, the controller 2 becomes ready to display a graph. It then reads the above-mentioned data stored in the RAM 13 and causes the functional graph or the statistical graph to be displayed on the display 10 driven by the display driver 11. The display 10 is realized by a liquid crystal display having a display screen of 96×64 dots for example.

The quadrant selection table 14 is provided in the electronic computing apparatus 1 of the present embodiment in connection with quadrant selecting means for selecting a quadrant of a graph to be displayed on the display 10. Further, the quadrant scale selection table 15 is provided in connection with scale selecting means for selecting a scale of a graph to be displayed on the display 10.

Figure 2:
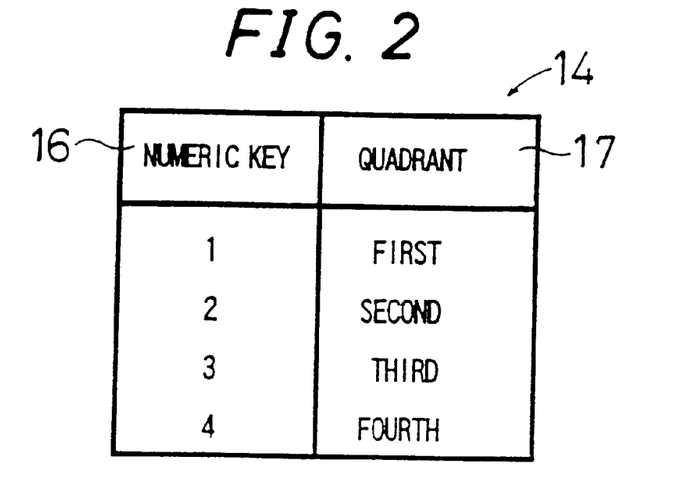
FIG. 2 shows a quadrant selection table 14.

FIG. 2 shows the quadrant selection table 14. The quadrant selection table 14 is a table for storing numeric key specifying information 16 specifying a predetermined numeric key 4 and quadrant specifying information 17 specifying a quadrant of a graph while correlating them each other. The first through fourth numeric keys correspond to the first through fourth quadrants, respectively, in the present embodiment.

Figure 3:
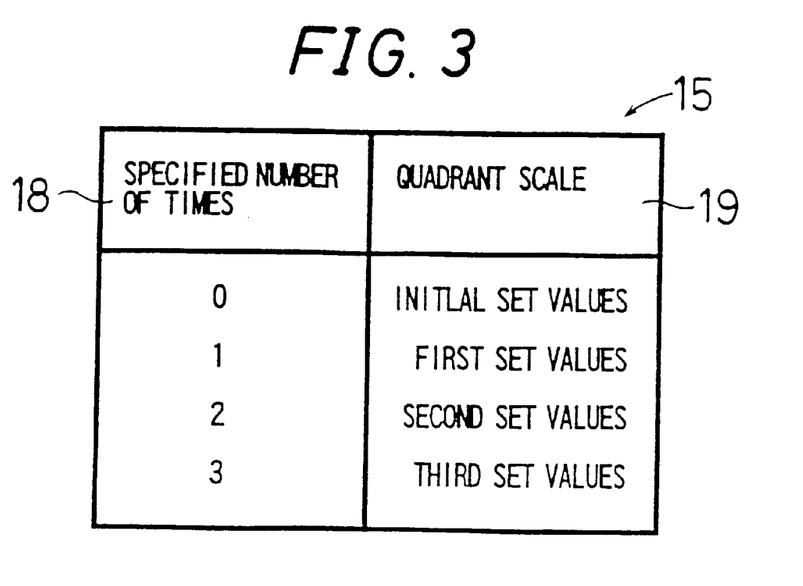
FIG. 3 shows a quadrant scale selection table 15.

FIG. 3 shows the quadrant scale selection table 15. The quadrant scale selection table 15 is a table for storing information 18 on a specified number of times indicative of a number of times the numeric key 4 has been specified and scale specifying information 19 specifying a scale of a quadrant while correlating them each other. The specified number of times of 0 through 3 correspond to the initial and first through third set values in the present embodiment.

When any one of the numeric keys of the first through fourth numeric keys is specified by a predetermined number of times when a graph is displayed on the display 10, a quadrant corresponding to the specified numeric key is selected and a scale corresponding to the specified number of times is selected. Then, the controller 2 displays again the graph in the selected quadrant with the selected scale.

Figure 4:
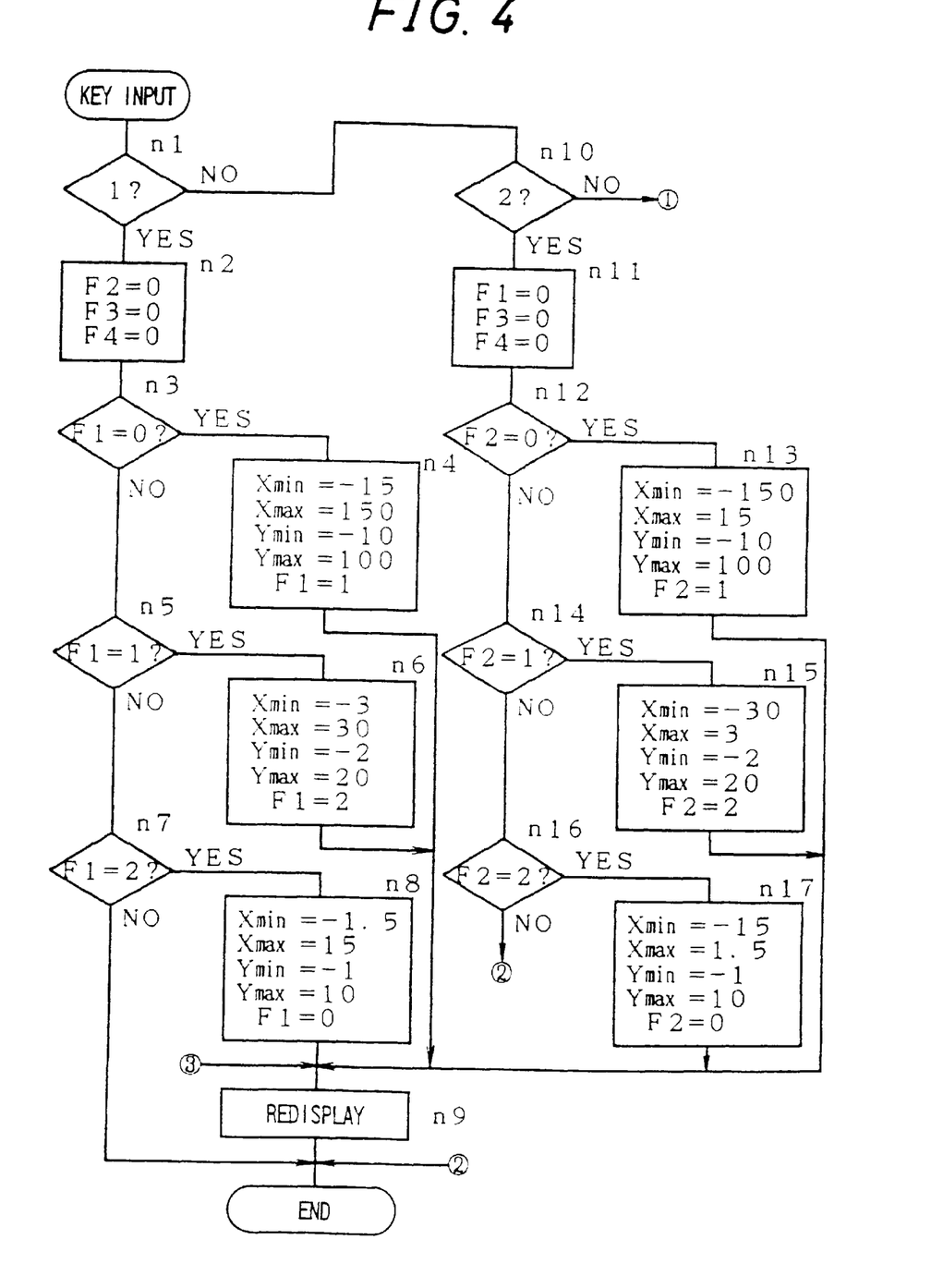
FIG. 4 is a flow chart for explaining quadrant selection and scale selection operations of the electronic computing apparatus 1.
Figure 5:
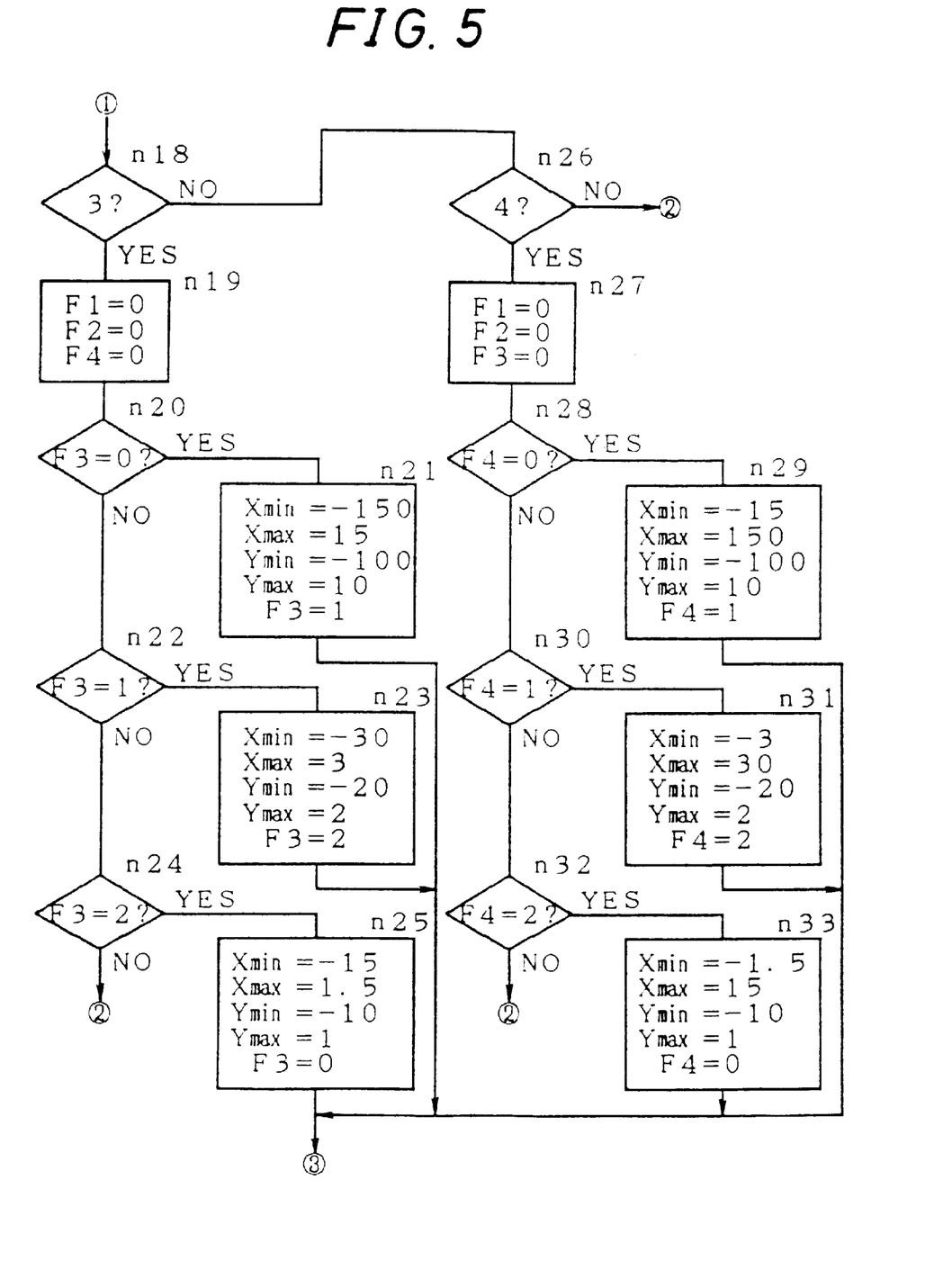
FIG. 5 is a flow chart for explaining the quadrant selection and scale selection operations of the electronic computing apparatus 1.

FIGS. 4 and 5 are flow charts for explaining quadrant selection and scale selection operations of the electronic computing apparatus 1. It is noted that the specified number of times of the first through fourth numeric keys are counted by variables F1 through F4, respectively, and the variables F1 through F4 are set at zero in the initial state. Further, as for the graph to be displayed on the display 10 in the initial state, all of the first through fourth quadrants are displayed with the scale of the initial set values. The initial set values are set at, for example, Xmin=−4.7, Xmax=4.7, Ymin=−3.1 and Ymax=3.1 so that the respective values coincide with the left, right, upper and lower ends of the screen.

When a key input has been made from the key input section 3 in the state while the graph is displayed on the display 10, it is discriminated whether it is an input from the first numeric key or not in step n1. When it is the input from the first numeric key, i.e. when it is selected to display the graph in the first quadrant, the process advances to step n2 to set the variables F2 through F4 at zero. Then, the process advances to step n3.

In step n3, it is discriminated whether the variable F1 is zero or not. When it is zero, i.e. when the first numeric key has been specified once, the process advances to step n4 to change and set the scale of the graph at the first set values. For instance, they are set as Xmin=−15, Xmax=150, Ymin=−10 and Ymax=100. Further, the variable F1 is set at 1. Then, the process advances to step n9 to display again the graph in the first quadrant with the scale of the first set values and ends the operation.

When the variable F1 is not zero in step n3, it is discriminated whether the variable F1 is 1 or not in step n5. When it is 1, i.e. when the first numeric key has been specified twice, the process advances to step n6 to change and set the scale of the graph at the second set values. For instance, they are set as Xmin=−3, Xmax=30, Ymin=−2 and Ymax=20. Further, the variable F1 is set at 2. Then, the process advances to step n9 to display again the graph in the first quadrant with the scale of the second set values and ends the operation.

When the variable F1 is not 1 in step n5, it is discriminated whether the variable F1 is 2 or not in step n7. When it is 2, i.e. when the first numeric key has been specified three times, the process advances to step n8 to change and set the scale of the graph at the third set values. For instance, they are set as Xmin=−1.5, Xmax=15, Ymin=−1 and Ymax=10. Further, the variable F1 is set at 0. Then, the process advances to step n9 to display again the graph in the first quadrant with the scale of the third set values and ends the operation.

When it is determined that the input is not the input from the first numeric key in step n1, it is discriminated whether it is the input from the second numeric key or not in step n10. When it is the input from the second numeric key, i.e. when it is selected to display the graph in the second quadrant, the process advances to step nil to set the variables F1, F3 and F4 at zero. Then, the process advances to step n12.

In step n12, it is discriminated whether the variable F2 is zero or not. When it is zero, i.e. when the second numeric key has been specified once, the process advances to step n13 to change and set the scale of the graph at the first set values. For instance, they are set as Xmin=−150, Xmax=15, Ymin=−10 and Ymax=100. Further, the variable F2 is set at 1. Then, the process advances to step n9 to display again the graph in the second quadrant with the scale of the first set values and ends the operation.

When the variable F2 is not zero in step n12, it is discriminated whether the variable F2 is 1 or not in step n14. When it is 1, i.e. when the second numeric key has been specified twice, the process advances to step n15 to change and set the scale of the graph at the second set values. For instance, they are set as Xmin=−30, Xmax=3, Ymin=−2 and Ymax=20. Further, the variable F2 is set at 2. Then, the process advances to step n9 to display again the graph in the second quadrant with the scale of the second set values and ends the operation.

When the variable F2 is not 1 in step n14, it is discriminated whether the variable F2 is 2 or not in step n16. When it is 2, i. e. when the second numeric key has been specified three times, the process advances to step n17 to change and set the scale of the graph at the third set values. For instance, they are set as Xmin=−15, Xmax=1.5, Ymin=−1 and Ymax= 10. Further, the variable F2 is set at 0. Then, the process advances to step n9 to display again the graph in the second quadrant with the scale of the third set values and ends the operation.

When it is determined that the input is not the input from the second numeric key in step n10, it is discriminated whether it is the input from the third numeric key or not in step n18. When it is the input from the third numeric key, i.e. when it is selected to display the graph in the third quadrant, the process advances to step n19 to set the variables F1, F2 and F4 at zero. Then, the process advances to step n20.

In step n20, it is discriminated whether the variable F3 is zero or not. When it is zero, i.e. when the third numeric key has been specified once, the process advances to step n21 to change and set the scale of the graph at the first set values. For instance, they are set as Xmin=−150, Xmax=15, Ymin=−100 and Ymax=10. Further, the variable F3 is set at 1. Then, the process advances to step n9 to display again the graph in the third quadrant with the scale of the first set values and ends the operation.

When the variable F3 is not zero in step n20, it is discriminated whether the variable F3 is 1 or not in step n22. When it is 1, i.e. when the third numeric key has been specified twice, the process advances to step n23 to change and set the scale of the graph at the second set values. For instance, they are set as Xmin=−30, Xmax=3, Ymin=−20 and Ymax=2. Further, the variable F3 is set at 2. Then, the process advances to step n9 to display again the graph in the third quadrant with the scale of the second set values and ends the operation.

When the variable F3 is not 1 in step n22, it is discriminated whether the variable F3 is 2 or not in step n24. When it is 2, i.e. when the third numeric key has been specified three times, the process advances to step n25 to change and set the scale of the graph at the third set values. For instance, they are set as Xmin=−15, Xmax=1.5, Ymin=10 and Ymax= 1. Further, the variable F3 is set at 0. Then, the process advances to step n9 to display again the graph in the third quadrant with the scale of the third set values and ends the operation.

When it is determined that the input is not the input from the third numeric key in step n18, it is discriminated whether it is the input from the fourth numeric key or not in step n26. When it is the input from the fourth numeric key, i.e. when it is selected to display the graph in the fourth quadrant, the process advances to step n27 to set the variables F1 through F3 at zero. Then, the process advances to step n28.

In step n28, it is discriminated whether the variable F4 is zero or not. When it is zero, i.e. when the fourth numeric key has been specified once, the process advances to step n29 to change and set the scale of the graph at the first set values. For instance, they are set as Xmin=−15, Xmax=150, Ymin=−100 and Ymax=10. Further, the variable F4 is set at 1. Then, the process advances to step n9 to display again the graph in the fourth quadrant with the scale of the first set values and ends the operation.

When the variable F4 is not zero in step n28, it is discriminated whether the variable F4 is 1 or not in step n30. When it is 1, i.e. when the fourth numeric key has been specified twice, the process advances to step n31 to change and set the scale of the graph at the second set values. For instance, they are set as Xmin=−3, Xmax=30, Ymin=−20 and Ymax=2. Further, the variable F4 is set at 2. Then, the process advances to step n9 to display again the graph in the fourth quadrant with the scale of the second set values and ends the operation.

When the variable F4 is not 1 in step n30, it is discriminated whether the variable F4 is 2 or not in step n32. When it is 2, i.e. when the fourth numeric key has been specified three times, the process advances to step n33 to change and set the scale of the graph at the third set values. For instance, they are set as Xmin=−1.5, Xmax=15, Ymin=10 and Ymax= 1. Further, the variable F4 is set at 0. Then, the process advances to step n9 to display again the graph in the fourth quadrant with the scale of the third set values and ends the operation.

When it is determined that it is not the input from the fourth numeric key in step n26, the operation is ended as it is.

Figure 6A:
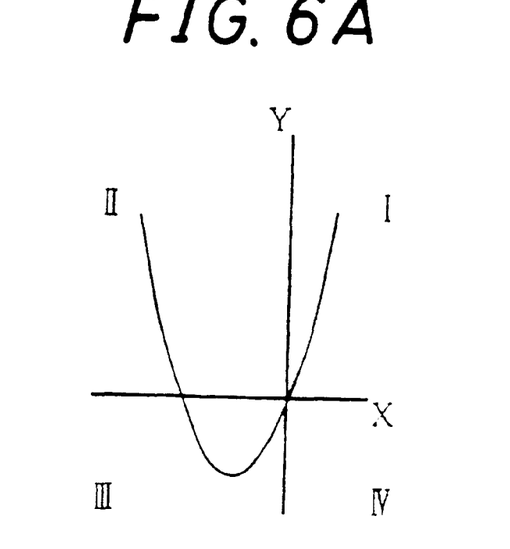
FIG. 6A shows one example of a graph in which a functional graph of a functional expression Y=X(X+3) is displayed.
Figure 6B:
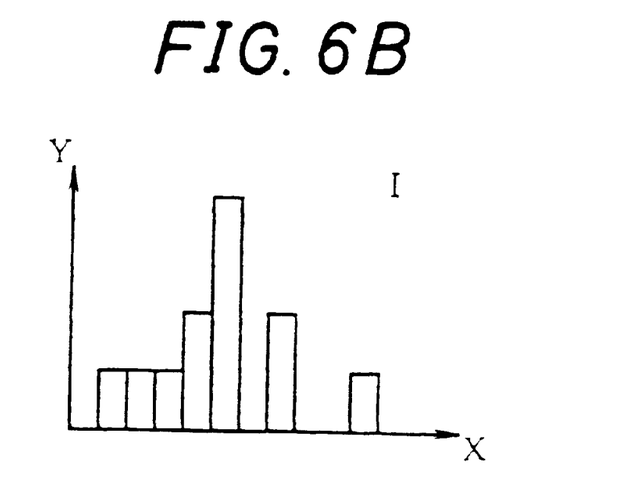
FIG. 6B shows an example of a graph in which a statistical graph is displayed.

When a functional graph of a functional expression Y=X (X+3) is to be displayed, a graph as shown in FIG. 6A is displayed. Then, the first quadrant (I) is displayed again with a predetermined scale by specifying the first numeric key by a predetermined number of times. Similarly, the second quadrant (II), the third quadrant (III) or the fourth quadrant (IV) is displayed again with a predetermined scale by specifying any one of the second through fourth numeric keys by a predetermined number of times. Also when a statistical graph is to be displayed, a graph as shown in FIG. 6B may be displayed by selecting a quadrant and scale by executing the same process with the above-mentioned case of displaying the functional graph.

As described above, the electronic computing apparatus 1 of the first embodiment and the graph displaying method applied to the computing apparatus allow the graph to be displayed based on the data input to display the graph. They allow the most appropriate graph to be quickly displayed because the quadrant selected from the displayed graph is displayed again with the selected scale.

It is noted that although the case of selectively displaying any one of the first through fourth quadrants while correlating the first through fourth numeric keys with the first through fourth quadrants from each other has been explained in the present embodiment, a case of selectively displaying any one of the following sets of quadrants; the first and second quadrants, the second and third quadrants, the third and fourth quadrants, the first and fourth quadrants, and the first through fourth quadrants, while correlating each quadrant set to another numeric key also falls within the scope of the present invention.

Further, although the case of displaying a graph with the three kinds of scales by correlating the specified number of times of one to three times of the numeric key with the first through third set values of the scale has been explained, a case of displaying a graph with four or more kinds of scales by correlating the specified number of times of four or more with the set values also falls within the scope of the invention. A case of displaying a graph by one or two kinds of scale also falls within the scope of the invention.

Still more, the correspondence between the numeric keys and the quadrants is not limited only to that described in the present embodiment. For instance, a ninth numeric key may be correlated with the first quadrant, a seventh numeric key with the second quadrant, the first numeric key with the third quadrant and the third numeric key with the fourth quadrant, respectively.

It is also possible to arrange so as to move a graph displaying area in parallel in the upper direction (Y-axis plus direction) by specifying an eighth numeric key, in parallel in the lower direction (Y-axis minus direction) by specifying the second numeric key, in parallel in the right direction (X-axis plus direction) by specifying the sixth numeric key and in parallel in the left direction (X-axis minus direction) by specifying the fourth numeric key, and to display the center part of the graph by specifying a fifth numeric key.

Figure 7:
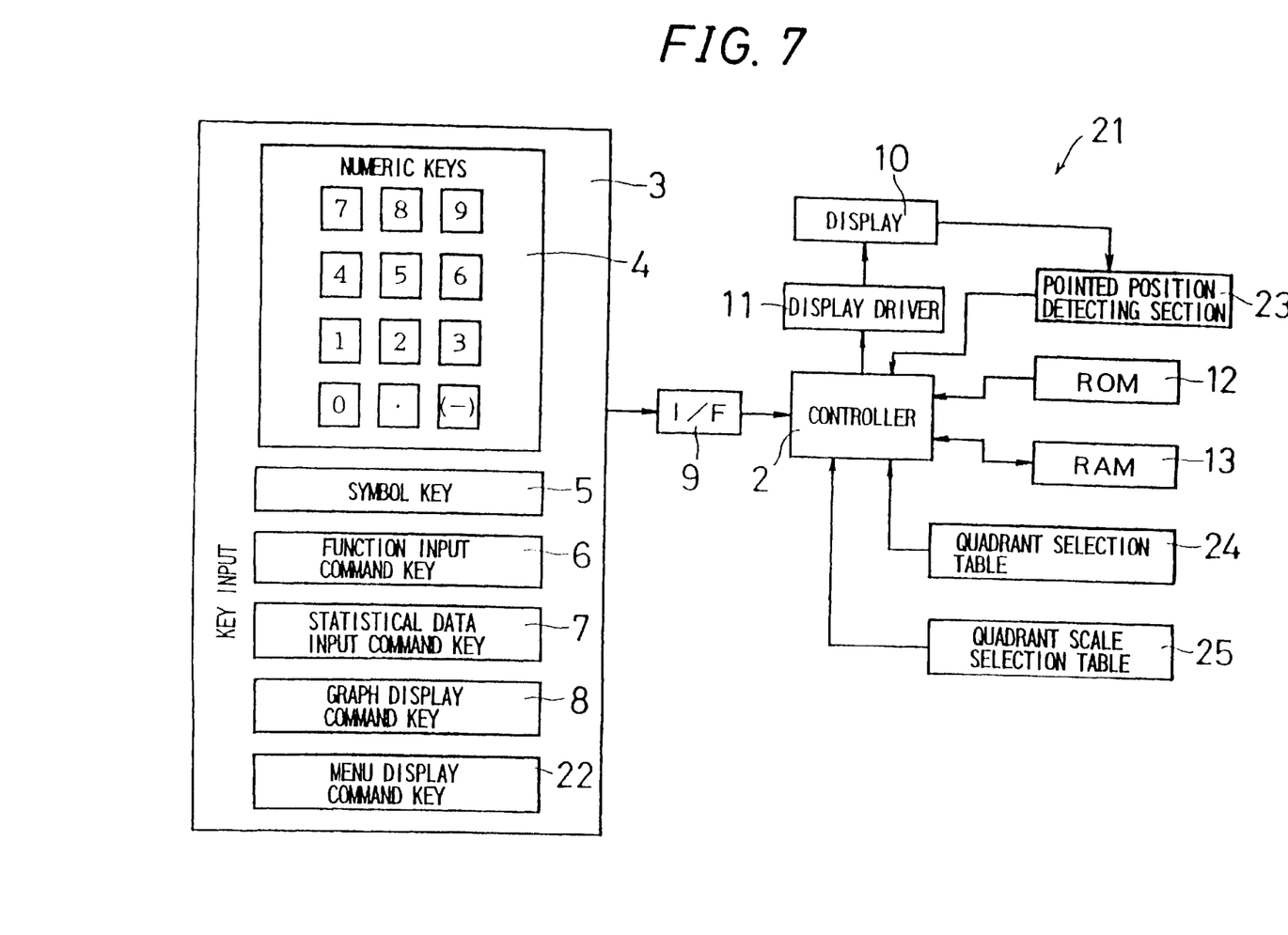
FIG. 7 is a block diagram showing an electrical structure of an electronic computing apparatus 21 according to a second embodiment of the present invention.

FIG. 7 is a block diagram showing an electrical structure of an electronic computing apparatus 21 according to a second embodiment of the invention. Although the electronic computing apparatus 21 is constructed almost in the same manner with the electronic computing apparatus 1 described above, it comprises a quadrant selection table 24 and quadrant scale selecting tables 25, instead of the quadrant selection table 14 and the quadrant scale selection table 15. It further comprises a pointed position detecting section 23. The key input section 3 further comprises a menu display command key 22. The same reference numerals denote the same parts and an explanation thereof will be omitted here.

When the menu display command key 22 of the key input section 3 is specified, a menu display command signal is given to the controller 2 via the I/F section 9. In response to the menu display command signal, the controller 2 becomes ready to display a menu and reads data stored in the quadrant selection table 24 and the quadrant scale selection tables 25 to display the menu on the display 10 driven by the display driver 11.

It is noted that an input face of an input apparatus such as a tablet is placed on the display screen of the display 10 in the present embodiment. The input face is translucent and an image displayed on the display screen is visible. An orthogonal coordinate system is also set on the input face. Still more, the electronic computing apparatus 21 is equipped with a pointing apparatus such as an input pen. The pointed position detecting section 23 detects a coordinate point on the input face pointed by the input pen and gives a coordinate point signal to the controller 2. Based on the coordinate point signal, the controller 2 executes the preset operation on the specified position.

Figure 8:
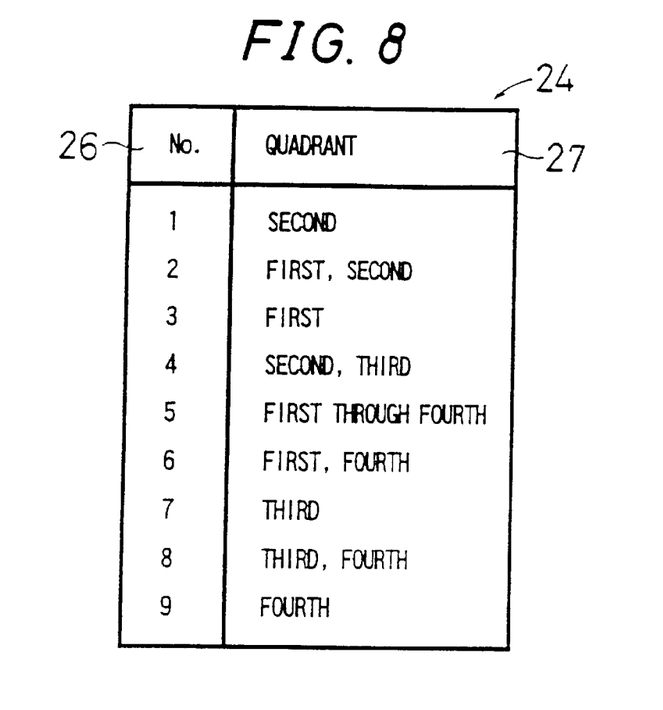
FIG. 8 shows a quadrant selection table 24.

FIG. 8 shows the quadrant selection table 24. The quadrant selection table 24 is a table for storing identifier information 26 for identifying a quadrant and quadrant specifying information 27 for specifying a quadrant of a graph while correlating them from each other. In the present embodiment, first identifier information correlates with the second quadrant, second identifier information with the first and second quadrants, third identifier information with the first quadrant, fourth identifier information with the second and third quadrants, fifth identifier information with the first through fourth quadrants, sixth identifier information with the first and fourth quadrants, seventh identifier information with the third quadrant, eighth identifier information with the third and fourth quadrants and ninth identifier information with the fourth quadrant.

Figure 9A:
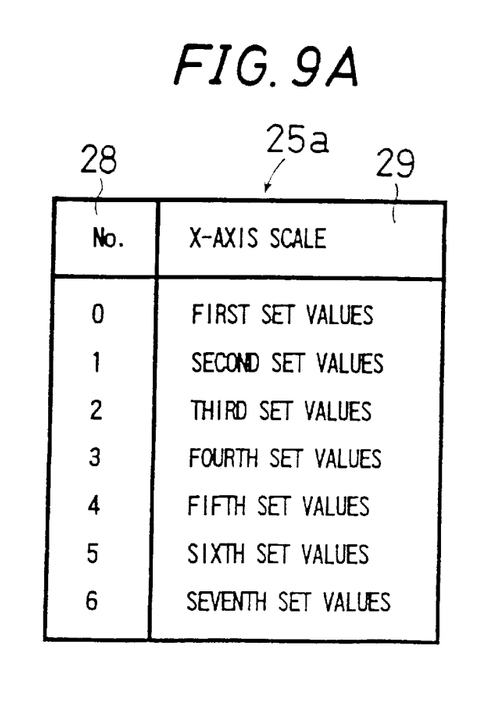
Figure 9B:
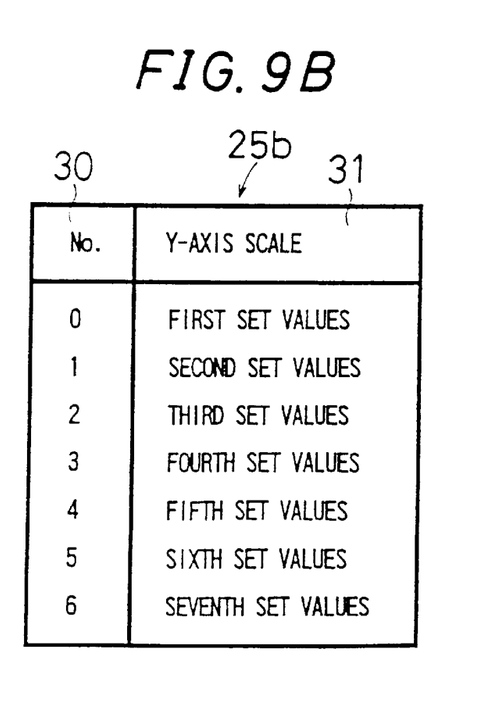

FIGS. 9A and 9B show the quadrant scale selection tables 25, wherein FIG. 9A shows an X-axis scale selection table 25a and FIG. 9B shows a Y-axis scale selection table 25b. The quadrant scale selection tables 25a and 25b are tables for storing identifier information 28 and 30 for identifying each scale set value and quadrant scale specifying information 29 and 31 while correlating them from each other, respectively. In the present embodiment, the identifier information of 0 through 6 correlate with the first through seventh scale set values from each other.

It is noted that the first through seventh scale set values are set per each quadrant stored in the quadrant selection table 24 described above.

Figure 10:
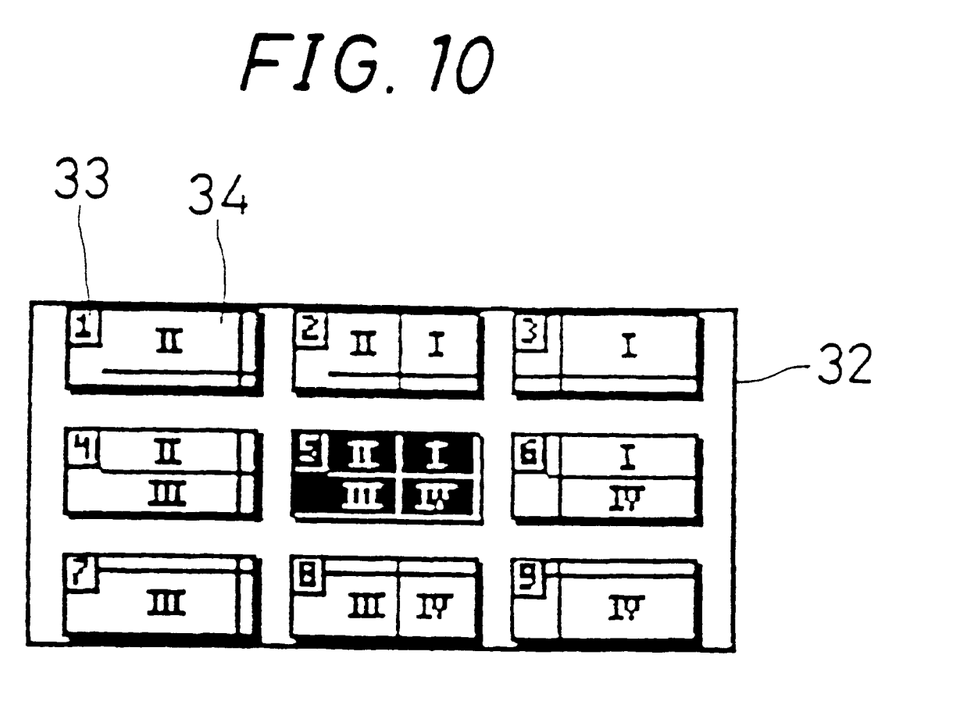
FIG. 10 shows a quadrant selection screen 32 based on the quadrant selection table 24.

FIG. 10 shows a quadrant selection screen 32 based on the quadrant selection table 24. When the menu display command key 22 is specified, the quadrant selection screen 32 is displayed at first. The quadrant selection screen 32 is divided into a plurality of areas each of which comprises an identifier information selection area 33 based on the identifier information 26 in the table 24 and a quadrant selection area 34 based on the quadrant specifying information 27 in the table 24. Specifying a desired area by the input pen allows the quadrant in the specified area to be selected. Here, the area to be specified may be either the identifier information selection area 33 or the quadrant selection area 34.

Figure 11A:
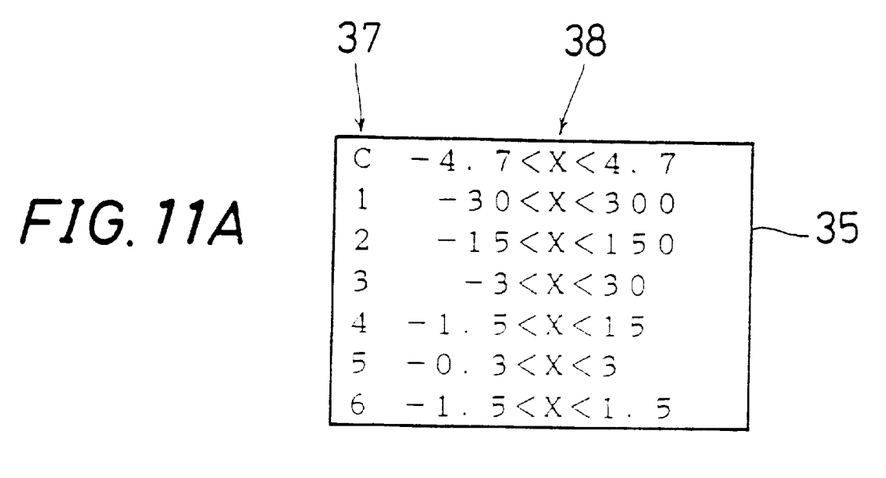
FIG. 11A shows one example of an X-axis scale selection screen 35 based on the quadrant scale selection table 25a and FIG. 11B shows one example of a Y-axis scale selection screen 36 based on the quadrant scale selection table 25b.
Figure 11B:
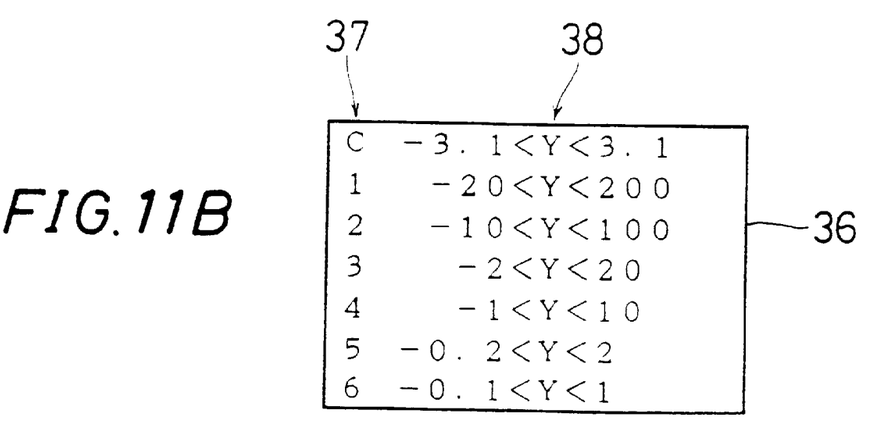

FIG. 11A shows one example of an X-axis scale selection screen 35 based on the quadrant scale selection table 25a and FIG. 11B shows one example of a Y-axis scale selection screen 36 based on the quadrant scale selection table 25b. When a desired quadrant is selected by the quadrant selection screen 32 described above, the first through seventh scale set values corresponding to the selected quadrant are selected, displaying the X-axis scale selection screen 35 and the Y-axis scale selection screen 36 presenting the first through seventh scale set values.

The X-axis scale selection screen 35 is divided into a plurality of areas each of which comprises an identifier information selection area 37 based on the identifier information 28 in the table 25a and a quadrant scale selection area 38 based on the X-axis scale specifying information 29 in the table 25a. Then, specifying a desired area by the input pen allows an X-axis scale of the specified area to be selected. Similarly, the Y-axis scale selection screen 36 is divided into a plurality of areas each of which comprises an identifier information selection area 37 based on the identifier information 30 in the table 25b and a quadrant scale selection area 38 based on the Y-axis scale specifying information 31 in the table 25b. Then, specifying a desired area by the input pen allows a Y-axis scale of the specified area to be selected. Here, the area to be specified may be either the identifier information selection area 37 or the quadrant selection area 38. In FIGS. 11A and 11B, the scale denoted by C is the scale being selected.

Figure 12A:
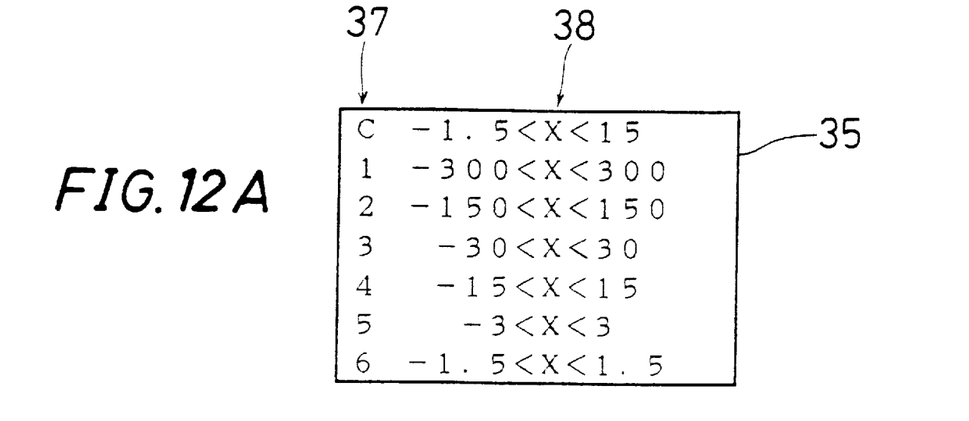
FIG. 12A shows another X-axis scale selection screen 35 based on the quadrant scale selection table 25a and FIG. 12B shows another Y-axis scale selection screen 36 based on the quadrant scale selection table 25b.
Figure 12B:
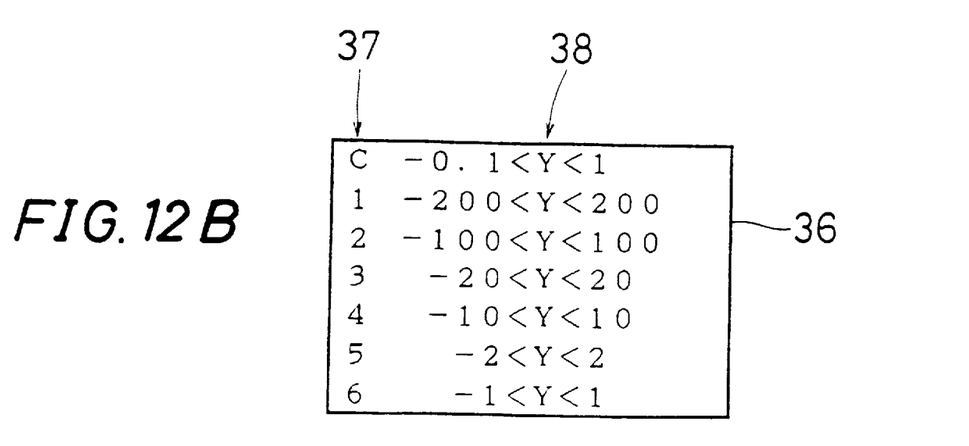

FIG. 12A shows another X-axis scale selection screen 35 based on the quadrant scale selection table 25a and FIG. 12B shows another Y-axis scale selection screen 36 based on the quadrant scale selection table 25b. Because the first through seventh scale set values are set respectively per quadrant stored in the quadrant selection table 24 described above, the different first through seventh scale set values are displayed when a different quadrant is selected.

As described above, the electronic computing apparatus 21 and the graph displaying method applied to such computing apparatus of the second embodiment allow the most appropriate quadrant to be selected while watching the contents stored in the quadrant selection table 24 because such table 24 is displayed and the most appropriate scale to be selected while watching the contents stored in the quadrant scale selection table 25 because such table 25 is displayed. Accordingly, the quadrant thus selected may be displayed again with the selected scale.

It is noted that the quadrant may be selected not only by specifying the plurality of areas displayed on the quadrant selection screen 32 by the input pen but also by specifying by the numeric key 4 or the symbol key 5 which correspond to the identifier information selection area 33 for example. The scale may be also selected in the same manner. Further, the scale set value may be set appropriately by the ratio of lengths in the vertical and horizontal directions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic computing apparatus having a graph displaying function for displaying a graph on graph displaying means on the basis of data for displaying the graph, the electronic computing apparatus comprising:

quadrant selection table displaying means for displaying a quadrant selection table;

quadrant selecting means for selecting a quadrant of the graph displayed on the graph displaying means;

scale selecting means for selecting a scale of the graph displayed on the graph displaying means; and display control means for displaying again a part of the graph in the quadrant selected by the quadrant selecting means with the scale selected by the scale selecting means on the graph displaying means.

2. The electronic computing apparatus of claim 1, wherein the quadrant selecting means includes:

a plurality of quadrant specifying means; and wherein the quadrant selection table for storing the quadrant specifying means and quadrants in correspondence to each other, and a quadrant corresponding to a quadrant specifying means selected from among the plurality of quadrant specifying means is selected from the quadrant selection table.

3. The electronic computing apparatus of claim 1, wherein the scale specifying means includes:

single scale specifying means; and a scale selection table for storing a number of times specified by the scale specifying means and scales in correspondence with each other, and selects a scale corresponding to the number of times specified by the scale specifying means from the scale selection table.

4. The electronic computing apparatus of claim 3, further comprising scale selection table displaying means for displaying the scale selection table.

5. A method for displaying a graph on an electronic computing apparatus, the method comprising the steps of:

displaying a graph on the basis of data for displaying the graph;

displaying a quadrant selection table;

selecting a quadrant from the table for redisplay;

selecting a scale of redisplay; and redisplaying a graph which is a part of the displayed graph existing in the selected quadrant, on the selected scale.

6. The method for displaying a graph on an electronic computing apparatus of claim 5, wherein the scale can be specified by a number of times of specifying the selected quadrant of the graph to be redisplayed.

7. The method for displaying a graph on an electronic computing apparatus of claim 5, wherein all quadrants possible to select are displayed in the quadrant selection table.

8. The method for displaying a graph on an electronic computing apparatus of claim 5, wherein all scales possible to select are displayed in the step of selecting a scale.

* * * * *